July 20, 1965 M. MINICH 3,196,377

ELECTRICAL CONNECTOR

Filed Aug. 4, 1961 2 Sheets-Sheet 1

INVENTOR:
Michael Minich

By Smyth, Roston & Pavitt
Attorneys

July 20, 1965 M. MINICH 3,196,377

ELECTRICAL CONNECTOR

Filed Aug. 4, 1961 2 Sheets-Sheet 2

INVENTOR:
Michael Minich
By Smyth, Roston & Pavitt
Attorneys

United States Patent Office 3,196,377 Patented July 20, 1965

3,196,377
ELECTRICAL CONNECTOR

Michael Minich, Santa Susana, Calif., assignor to Matrix Science Corporation, Burbank, Calif., a corporation of Delaware Filed Aug. 4, 1961, Ser. No. 129,309
6 Claims. (Cl. 339—17)

The present invention relates to electrical connector means for interconnecting two circuits with each other and more particularly it relates to electrical connector means for interconnecting a first circuit on a circuit board with a second circuit which is external to the first board.

At the present time it is frequently desirable in electronic equipment to employ so-called circuit boards wherein the electronic circuit is printed or otherwise secured to one or more boards. This is particularly true in complex equipment wherein the various sub-circuits may be on separate circuit boards to facilitate manufacture and assembly. In addition in the event of a malfunction of the overall equipment the defective board may be removed and replaced with an operative one. This permits a rapid servicing of the equipment so that it may be maintained operative a larger percentage of the time even though the defective board is leisurely repaired. In order to permit the use of circuit boards in the foregoing manner it is essential that connector means be provided for interconnecting the different boards. This means must be adapted to permit a rapid connecting and disconnecting while insuring a highly reliable mechanical and electrical connection while at the same time they must be simple and cheap to install and manufacture. Numerous connector means have heretofore been provided for this purpose which are suitable for some types of installation. However they have not been entirely satisfactory in other types of installations. Among other things they have not always been easily connected and disconnected while providing a good electrical and mechanical contact particularly when the installation is subject to a large amount of vibration and at the same time been inexpensive to make and use.

It is therefore an object of the present invention to provide a new and novel connector means that overcomes the foregoing difficulties. This is to be accomplished by providing connector means that is inexpensive to manufacture as well as use in which will not only permit one or more circuit boards to be easily connected and disconnected but will also insure a good electrical contact at all times including periods of severe vibrations. In addition the connector means will permit placing the circuit board in a hermetically sealed container.

More particularly it is proposed to provide a connector means wherein a housing member is provided that may be permanently secured to a suitable bulkhead and has a cavity therein that contains a plurality of inexpensive and reliable connector members. These connector members are adapted to receive suitable contacts on the circuit board, and become mechanically and electrically connected thereto. In addition gasket means may be provided that will fit into the cavity to be compressed between the board and housing to seal any openings through the connector means, thus insuring an air-tight seal.

These and other features and advantages of the present invention will become more apparent from the following description, particularly when taken in connection with the accompanying drawings wherein like reference numerals designate like parts and wherein.

Figures 13, 14, 15, 16, 17, 18, 19, 20, 21, 22:
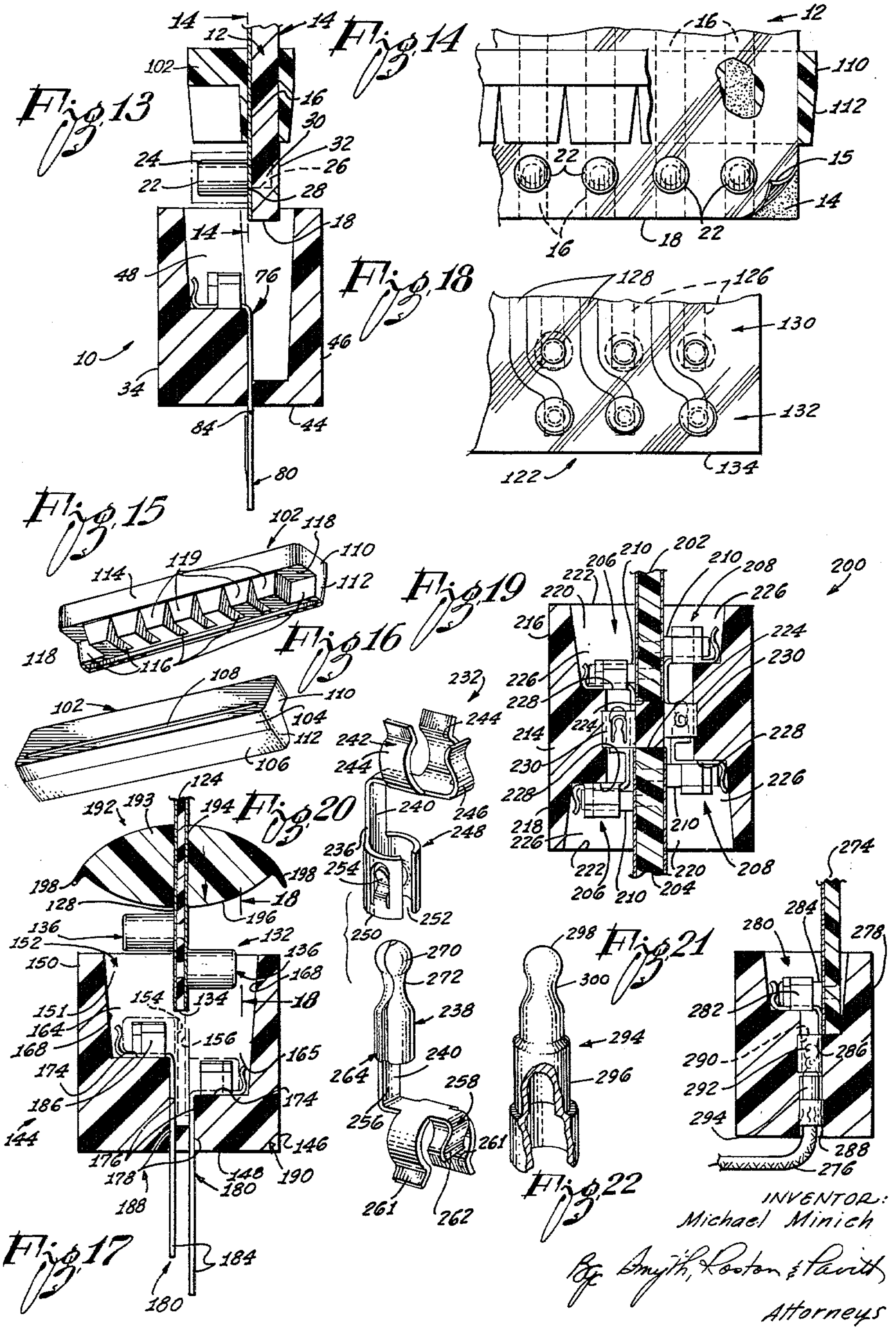
FIGURE 13 is a cross sectional view similar to FIGURE 11 but showing a circuit board being inserted thereinto.
FIGURE 14 is a side view of the circuit board shown in FIGURE 13 and taken substantially from the plane of line 14—14 therein and looking in the direction of the arrows thereon.
FIGURE 15 is a perspective view of the resilient gasket member shown in FIGURE 13 for sealing the junction between the circuit board and housing member disposed therein.
FIGURE 16 is a perspective view of the resilient gasket of FIGURE 15 taken from a different angle.
FIGURE 17 is a transverse cross sectional view of connector means embodying a different form of the present invention.
FIGURE 18 is a side view of the circuit board employed in the embodiment of FIGURE 17 and taken substantially along the plane of line 18—18 therein.
FIGURE 19 is a cross sectional view of connector means embodying another form of the present invention.
FIGURE 20 is a perspective view of a connector member suitable for use in the connector means of FIGURE 19.
FIGURE 21 is a transverse cross sectional view of connector means embodying an additional form of the present invention.
FIGURE 22 is a perspective view of a connector member employed in the embodiment of FIGURE 21.

Referring to the drawings in more detail and particularly to FIGURES 1 to 16 inclusive, the present invention is embodied in an electrical connector means 10 such as seen in FIGURES 13 and 14 that is particularly adapted for interconnecting portions of a first electrical circuit which may be printed or otherwise secured to a circuit board 12 with portions of a second electrical circuit that is external to the circuit board 12.

Although any suitable arrangement may be employed the present circuit board 12 includes a rigid base member 14 that has the various electrical conductors 16 in the circuit thereon secured to at least one of the sides of the member 14. These conductors 16 may be secured to the member 14 in any convenient manner such as for example by bonding a sheet 15 with a printed circuit thereon to the member 14. The various conductors or portions of the circuit that are to be electrically interconnected with corresponding conductors in a circuit external to the first board 12 lead to and terminate adjacent to the edge 18 of the member 14. An electrical contact may be rigidly mounted on the member 14 and electrically interconnected with a suitable conductor 16 in the circuit so as to provide a contact surface. In the present instance the eelctrical contact comprises a post 22 that has an enlarged shank 24 that is separated from a neck 26 of reduced diameter by a radial shoulder 28. The neck 26 extends through a passage 30 in the member and has the end 32 thereof headed to fill a countersink on the end of the passaged 30 to thereby retain the shoulder 28 in intimate electrical contact with the electrical conductor 16.

The present connector means 10 also includes a housing member 34 as best seen in FIGURES 6 to 12 that may be molded out of any suitable material such as a plastic. The housing member 34 includes a base 36 having a plane surface 38 on one side thereof which is adapted to abut a bulkhead and be secured thereto by suitable fastening means such as a rivet or bolt extending through the openings 42 in the opposite ends of the base 36. The opposite side of the base 36 forms a plane surface 44 which projects from the bulkhead so as to be exposed and be readily accessible.

In addition, the housing member 34 includes a portion 46 that projects from the surface and substantially normal to the base 36 through the bulkhead. The interior of this portion 46 includes a cavity or chamber 48 that is defined by a pair of side walls 50 and 52, a pair of end walls 54 and 56 and a bottom 58. These walls 50 to 56 extend all the way from the bottom 58 to the end of the projection 46 to thereby form an opening 60 in the top of the housing member 34. The cavity 48 and this opening 60 preferably have a size and shape that corresponds to the size and shape of the edge 18 of the circuit board 12. Thus the edge 18 of the board 12 may be inserted through the opening 60 and into the cavity 48 into close proximity to the bottom 58.

The side walls 50 and 52 preferably have substantially plane surfaces that extend along the opposite sides of the cavity 48 and inwardly to terminate at the bottom 58. The walls preferably taper slightly inwardly and toward each other to thereby facilitate the removal of the core employed in molding the cavity 48 and also, as will become apparent subsequently, to facilitate sealing the connector means 10. One of the side walls 52 preferably includes a plurality of pockets 62 that are recessed therein at preselected intervals along the wall 52. These pockets 62 correspond in number and spacing to the connector posts 22. Thus, whenever the edge 18 of the board 12 is disposed in the cavity 48 a connector post 22 will be disposed in each of the pockets 62.

Each of the pockets 62 includes an inclined or inwardly convergent back and side walls 64 and 66 that extends inwardly from the opening for approximately half the depth of the cavity 48 to thereby form a seat 68 at approximately the middle of the wall 52. Although the side walls 66 may terminate primarily at the seat 68, they may also include narrow portions 70 that extend all the way to the bottom 58 of the cavity. These narrow portions 70 will thus be effective to thereby act as guides.

A plurality of restricted passages 72 may be provided through the base 36 to form an aligned row of openings 74 in the surface 44. One passage 72 is provided for each of the pockets 62 and is preferably disposed in substantial alignment with a guide 70.

Figures 1, 2, 3, 4, 5, 6, 7, 8, 9, 10, 11, 12:
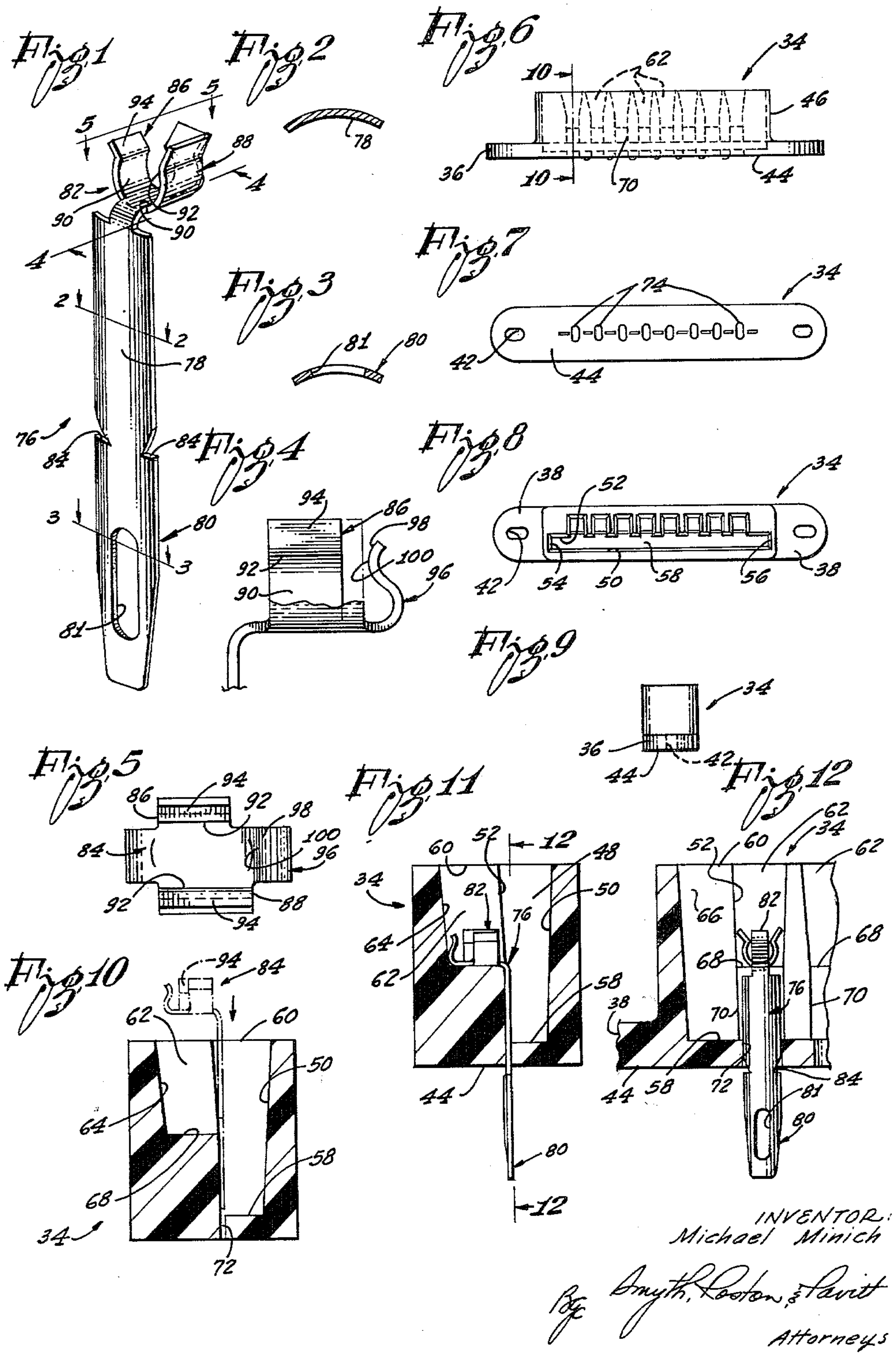
FIGURE 1 is a perspective view of one form of a connector member particularly adapted for use in the present invention.
FIGURE 2 is a cross sectional view of the connector of FIGURE 1 taken substantially along the plane of line 2—2 in FIGURE 1 and looking in the direction of the arrows thereon.
FIGURE 3 is a cross sectional view similar to FIGURE 2 but taken substantially along the plane of line 3—3 in FIGURE 1 and looking in the direction of the arrows thereon.
FIGURE 4 is a fragmentary side view of a portion of the connector member of FIGURE 1 and taken from the plane of line 4—4 therein and looking in the direction of the arrows thereon.
FIGURE 5 is a plan view of the connector of FIGURE 1 and taken from the plane of line 5—5 therein and looking in the direction of the arrows thereon.
FIGURE 6 is a side view of one form of a housing member particularly adapted for use in the present invention.
FIGURE 7 is a bottom plan view of the housing member of FIGURE 6.
FIGURE 8 is a top plan view of the housing member of FIGURE 6.
FIGURE 9 is an end view of the housing member of FIGURE 6.
FIGURE 10 is a cross sectional view on an enlarged scale of the housing member of FIGURES 6 to 9 taken substantially along the plane of line 10—10 in FIGURE 6 and showing the connector member of FIGURE 1 being inserted thereinto.
FIGURE 11 is a cross sectional view similar to FIGURE 10 but showing the connector member fully seated therein.
FIGURE 12 is a cross sectional view taken substantially along the plane of line 12—12 in FIGURE 11.

A separate connector member 76 as best seen in FIGURE 1 may be provided for each of the pockets 62. In the present instance the connectors 76 are all substantially identical to each other and are preferably adapted to be formed by a simple and economical process such as stamping from sheet metal. The present connector 76, referring particularly to FIGURES 1 to 5 inclusive, includes an elongated shank 78 having a connector portion 80 on one end that is adapted to be connected to a portion of an electrical circuit and a portion such as a socket 82 on the other end that is adapted to be connected to the connector posts 22 on the circuit board 14.

The shank 78 of the connector 76 preferably has a width and thickness large enough to permit the shank to just fit through the passages 72. Thus the connector portion 80 will project through the opening 74 and beyond the surface 44 of the base 36 to thereby make the connector portion 80 readily accessible for interconnection with other circuitry. In the present instance the connector portion 80 includes an aperture 81 adapted to have a conductor extend therethrough. However it should be noted that any form of connector may be employed.

As may be seen in FIGURES 2 and 3, the shank 78 may have a slightly arcuate cross section that can readily be deformed into a flat enough section to fit through the passage 72. The edges of the shank may be provided with a pair of recessed notches. These notches will form a pair of ears 84 that are positioned to engage the surface 44 on the base 36 when the connector 76 is properly positioned on the housing 34.

Thus as the shank 78 passes through the passage 72 it will tend to be flattened until the recessed notches or ears 84 have passed through the openings 74. At this point the portion beyond the notch will be free to resume its original arcuate shape. At a consequence the ears 84 will tend to snap back over the base 36 and engage the surface 44 thereon and prevent the connector 76 being removed.

The portion on the end of the shank 78 for connecting to the electrical connector posts 22 may be of any suitable type. However, in the present instance it comprises a socket 82 that is adapted to have the connector post 22 fit therein so as to become mechanically locked onto the posts 22 and electrically interconnected with the electrical circuit on the circuit board 14. More particularly, the socket 82 is formed by a continuation of the shank 78 bent at substantially right angles to the shank 78. The distance between the ears 84 and the line of the bend is slightly greater than the distance from the seat 68 to the opening 74. Thus when the end of the shank 78 extends beyond the base 36 and the ears 84 lock it in position the socket 82 will be disposed adjacent the seat 68.

A pair of side fingers 86 and 88 are bent up and around into a generally U shaped configuration. Each of the fingers 86 and 88 may include a bowed portion 90 that forms essentially a portion of a circle that is slightly less in diameter than the outside diameter of the post 22. As a result the fingers 86 and 88 will be slightly deflected apart when the post 22 is disposed between them. The ends of the fingers are bent back upon themselves and then outwardly to form respectively a detent surface 92 and an entrance surface 94. Thus if the edge 18 of the board 12 is inserted into the cavity 48, one of the contact posts 22 will engage the entrance surfaces 94. If the inward movement of the board 12 continues the post 22 will ride on these surfaces 94 and push the entrance surfaces 94 apart until the space between the detent surfaces 92 is equal to or greater than the maximum diameter of the post 22. The post 22 will then pass between the detent surfaces 92 and into the bowed portion 90. At this instance the post 22 will become seated in the socket 82 and the detent surfaces 92 will then tend to lock the post 22 in this position. Since the diameter of the bowed portion 90 is less than that of the post 22 the fingers 86 and 88 will resiliently ride against the surface of the post 22 to insure an excellent electrical contact. When the posts 22 are disposed in the sockets 82 the edge 18 of the board 12 will extend down into the cavity 48 into close proximity to the bottom 58.

In addition it has been found desirable to provide a third finger 96 that is effective to increase the area of electrical contact and to help retain the contact post 22 locked in position. This finger 96 may be bent up at the end of the socket 82 so as to engage the end of the contact post 22. This finger 96 is essentially of similar configuration to the side fingers 86 and 88 except that the entrance and detent surfaces 98 and 100 are preferably slightly lower to provide a more positive contact with the end of the post 22.

Where the connector means 10 is to be employed in installations having large amounts of vibrations, it has been found advantageous for all of the fingers 86, 88 and 96 in the socket 82 to have a natural resonant vibrational frequency that differs substantially from that of the other fingers 86, 88 or 96. This may be easily accomplished by varying the tensions and/or masses of the fingers. As may be seen more particularly in FIGURES 4 and 5 each of the fingers among other things has a width that differs from the widths of the other fingers. Thus, if the structure upon which the connector means is mounted is vibrating at some particular frequency and vibrations are transmitted to the fingers 86, 88 and 96 it will be possible for only one of the fingers to vibrate in a resonant mode. Although this may cause that finger to vibrate with sufficient amplitude to impair its electrical and mechanical functions i.e. cause the finger to periodically disengage the post 22, the remaining fingers will not be vibrating in a resonant mode. In addition since the directions in which the fingers vibrate are angularly disposed with respect to each other, the vibrations will not only have to be of the correct frequency but also teh correct direction. Thus the mathematical probability of vibration disturbing the electrical contact is extremely low. As a consequence the remaining fingers will remain in intimate contact with the connector post 22 and thereby insure a good mechanical and electrical contact.

In order to protect the circuit board and the components thereon it may be desirable to enclose the circuit board 12 in a sealed container. In this event the bulkhead to which the housing 34 is secured may form one side of a sealed container and a seal may be provided in the connector means 10 for closing the opening 60 therethrough. In this event a gasket or grommet 102 may be placed in the opening 60 into the cavity 48 as shown in FIGURE 13. In the present instance, this grommet 102 is a member consisting of a resilient material such as rubber or a similar elastic material. The interior of the grommet has an elongated or rectangular opening 108 therethrough that corresponds to the cross sectional shape of the board member 14.

The exterior of the grommet 102 has a shape that corresponds to the opening 60 into the cavity 48. More particularly one side as may best be seen in FIGURE 16 includes a surface having a first portion 104 and a second portion 106. The first portion 104 is positioned adjacent the top of the grommet 102 and is parallel to the circuit board 12. The second portion 106 is disposed adjacent the bottom of the grommet and is tapered by an amount corresponding to the taper of the wall 50. In addition each of the ends may include a straight portion 110 and a portion 112 tapered similar to the end walls 54 and 56.

The second side wall of the grommet 102 is best seen in FIGURE 15 and it also includes straight portion 114 adjacent the top of the grommet and parallel to the circuit board 12. A second portion 116 is provided that is preferably set back from the straight portion to thereby form a shoulder 118 that engages the surface on the end of the projection 46. This portion 116 is also tapered so as to correspond to the taper present on the side wall 52.

In addition a plurality of projections 119 may be spaced along the tapered portion 116 to correspond in space and numbers to the pockets 62. Each projection 119 is positioned to register with one of the pockets 62 and extend thereinto. These projections 119 are also preferably tapered to correspond to the taper on the back 64 and side walls 66 of the pockets 62. It may thus be seen that when the grommet 102 is properly positioned on the board 12 adjacent the edge 18 and the edge 18 is forced into the cavity 48 the exterior of the grommet 102 will engage the surfaces forming the entrance to the cavity 48. As the board 12 is forced into the cavity 48 and the connector posts 22 into the sockets 62, the tapering surfaces on the grommet 102 and opening 60 will tend to compress the grommet and thereby seal the opening 60 against the passage therethrough of dirt, dust, moisture, etc.

As an alternative, the connector means 120 shown in FIGURES 17 and 18 may be employed. This connector means 120 is particularly adapted to increase the capacity of the connector means without materially increasing the size thereof. It may be employed with a circuit board 122 that includes a rigid base member 124 that has the various electrical conductors 126 and 128 in the circuit thereon secured to one or both sides of the base member 124 by any suitable means such as bonding sheets thereto having printed circuits thereon.

Two groups 130 and 132 of electrical contacts may be secured to the base member 124 so that the groups will be disposed on the opposite sides of the board 122 adjacent one edge 134 thereof. These electrical contacts may be of any suitable design such as the connector posts in the first embodiment. Each of these connector posts 136 includes an enlarged shank that is separated from a neck of reduced diameter by a radial shoulder. The connector posts 136 in the first group 130 have their shanks disposed on one side of the board 122 so that the shoulders thereon will engage the conductors 126 on that side of the base member 124. The connector posts 136 in the second group 132 may have their shanks disposed on the opposite side of the board 122 so that the shoulders thereon will engage and be electrically interconnected with the conductors 128 on the second side of the member 124.

In this connector means, a housing member 144 may be provided that is molded out of a suitable material such as plastic. The housing member 144 may be similar to the member 34 in the first embodiment in that it also includes a base 146 adapted to be secured to a bulkhead so that the base 146 and the surface 148 thereon will be exposed from the bulkhead. In addition, a projection 150 may extend from one side of the base 146 so as to project through the bulkhead and be accessible from that side thereof.

The interior of the projection 150 may include a cavity or chamber 152 that is defined by side walls 156 and a pair of end walls that extend all the way from the bottom to the end of the projection 150 to thereby form an opening 151 in the end of the projection 150. The size and shape of this cavity 152 is similar to that in the first embodiment except that it is sufficiently wide to fit therethrough and into the cavity 152. The edge 134 may thus be disposed adjacent the bottom 160.

The two side walls 156 are preferably similar to the side wall 52 in the first embodiment. More particularly each of the walls 156 includes a surface that tapers inwardly and has a series of pockets 164 or 165 recessed therein to correspond in size, number and spacing to the corresponding dimensions of the connector posts 136. Each of the pockets 164 includes an inclined back wall 168 and a pair of inwardly convergent side walls that extend inwardly from the opening for approximately half the depth of the cavity 152 to thereby form a seat 174 at approximately the middle of the wall 154 or 156. The side walls may also include narrow continuations that extend all the way to the bottom 160 of the cavity 152 to form guides 176.

A separate passage 178 may extend through the bottom in substantial alignment with each of the guides 176 to form a pair of rows of openings on the exposed surface 148 of the base 146.

A separate connector member 180 may be provided for each of the pockets 164 or 165 for receiving the connector posts 136. These connector members 180 are substantially identical to the connector member 76 shown in FIGURES 1 to 5 inclusive. That is the connector member 180 includes a shank which extends through the passage 178 with a connector portion 184 extending beyond the surface 148 and with a socket 186 consisting of resilient fingers disposed in a pocket 164 or 165. The connector members 180 may be divided into two separate groups 188 and 190. One group 188 may be disposed in the pockets 164 in the wall 154 to receive the group 130 of connector posts 136 on one side of the board 122. The other group 190 may be disposed in the pockets 165 in the wall 156 to receive the conector posts 136 on the other side of the board 122. This will thus permit a greater number of interconnections to be provided without increasing the length of the housing members 144 or the edge 134 of the board 122.

In the event it is desired to seal the opening 151 through the connector means 120 a gasket similar to that in the first embodiment may be employed or as an alternative the gasket 192 may be utilized. This gasket 192 includes a body 193 portion having an opening 194 therein that is adapted to have the base member 124 disposed therein. In addtion the body includes a convex surface 196 that is adapted to fit into the opening 151 and become wedged therein to provide an airtight or hermetic seal. In addition a flexible lip 198 may be provided around the periphery of the body 193 to fit over the end of the projection 150.

As a further alternative the embodiment of the connector means 200 shown in FIGURES 19 and 20 may be employed. This connector means 200 is particularly adapted to be employed for interconnecting the circuitry on a first circuit board 202 with the circuitry on a second board 204.

Although the circuit boards 202 and 204 may be similar to those in the first or second embodiments in the present instance each of the circuit boards has two groups 206 and 208 of connector posts 210 that are disposed on the opposite sides of the boards 202 and 204 adjacent the edges thereof. These connector posts 210 may be substantially identical to the connector posts in the preceding embodiments and have an enlarged shank that projects from the boards 202 and 204 with a shoulder thereon being in intimate electrical contact with one of the conductors on the board. The connector posts 210 in the first group 206 have their shanks disposed on one side of the board while the connector posts in the second group 208 have their shanks disposed on the opposite side of the board.

In this connector means 200 a housing member 214 which may be molded out of a suitable material such as a plastic is provided that includes a base or other means for securing the housing 214 to a bulkhead. Projections 216 and 218 may extend from the opposite sides of the base so that each projection 216 and 218 will be accessible from an opposite side of the bulkhead.

The projections 216 and 218 are substantially identical to each other and to the projection 150 in the second embodiment. Each projection includes a cavity or chamber 220 that is defined by a pair of side walls and a pair of end walls that extend all the way from the bottom 224 to thereby form openings 222 in the ends of the projection 216 and 218. The size and shape of this cavity 220 is sufficiently wide to permit a board 202 or 204 and the connector posts 210 on the two sides thereof to fit therethrough and into the cavity 220. The edges of the boards 202 and 204 may thus be disposed adjacent the bottom 224.

The two side walls of the cavity taper inwardly and have a series of pockets 226 recessed therein to correspond in size, number and spacing to the corresponding dimensions of the connector posts 210. Each of the pockets 226 includes an inclined back wall and a pair of inwardly convergent side walls that extend inwardly from the opening 222 for approximately half the depth of the cavity 220 to thereby form a seat 228 at approximately the middle of the wall.

Separate passages 230 may extend through the bottom 224 in substantial alignment with the pockets to thereby interconnect the two cavities 220 on the opposite sides of the member 214. These passages are slightly larger than the passages in the preceding embodiments.

A separate connector 232 (FIGURE 20) may be provided for each of the passages 230 for receiving and becoming interconnected with the connector posts 210 on the two boards 202 and 204. Each connector 232 includes a first member 236 and a second member 238. The first member 236 includes a shank 240 that has a socket 242 similar to the sockets in the preceding embodiments and is adapted to be disposed in a pocket 226 adjacent the seat 228 at the bottom thereof. The socket 242 is formed by a pair of side fingers 244 and an end finger 246 that are adapted to have the connector post 210 on board 202 disposed therein. The opposite end of the shank 240 includes a connector portion 248 adapted to extend into the passage 230 and be interconnected with another circuit element such as the second member 238. The present connector portion 248 includes a female socket 250 portion that is formed by rolling the edges of the shank into a cylindrical shape having a passage 252 extending axially therethrough. In addition a pair of spring detents 254 may project inwardly into the passage 252.

The second member 238 is similar to the first in that it also includes a shank 256 having a socket 258 on one end. This socket 258 fits on a seat 228. The socket 258 includes a pair of side fingers 261 and an end finger 262 that receive the connector posts 210 on the second circuit board 204. The opposite end of the shank 256 includes a connector portion 264 to cooperate with the connector portion 248 on the first member. More particularly this portion comprises a plug formed from the shank 256 so as to have a cylindrical extension that fits into the cylindrical passage 252. A head 270 forming a shoulder 272 may be provided that is positioned so that the detents 254 fit into the shoulder and thereby lock the members 236 and 238 together and in position in the pockets 226.

As a still further alternative the embodiment of FIGURES 21 and 22 may be employed. This embodiment is particularly adapted for interconnecting a circuit board 274 with one or more electrical conductors such as an insulated wire 276. In this embodiment the housing 278 and the various parts thereof are essentially identical to the corresponding parts in one or more of the preceding embodiments. The connector member 280 may be substantially identical to the member 236 in that it has a socket 282 on one end for receiving a connector post 284 on a circuit board 274 and a connector portion 286 that is disposed in a passage 288 in the housing 278. This connector portion 286 may include a cylindrical passage 290 with suitable spring detent means 292 therein. The end of the wire conductor has a member 294 secured thereto. This member 294 includes a shank 296 that is adapted to fit into the passage 290 in the connector portion 286. An enlarged head 298 may be provided on the end of the shank 296 so as to be separated therefrom by an annular groove 300. This groove 300 is positioned so that the spring detent means 292 will fit thereinto and secure the member 294 thereto.

What is claimed is:

1. Means for electrically interconnecting at least a portion of a first circuit with at least a portion of a second circuit on a circuit board having a plurality of substantially cylindrical electrical connector posts disposed thereon adjacent one edge of said board and projecting from said board at substantially right angles to the plane thereof, said means comprising a housing member having a chamber therein which forms an opening in one side of said housing for having said edge inserted therethrough and into said chamber, and a plurality of connector members mounted on said housing member, each of said connector members having at least a portion thereof disposed in said chamber with the remaining portion thereof being disposed substantially parallel to the plane of said board and extending through said housing to be connected to said first circuit, the portions of each of said connector members disposed in said chamber including a part disposed at substantially right angles to said remaining portion and a plurality of resilient fingers arranged at substantially right angles to said part to form a socket into which said posts may be electrically and mechanically positioned.

2. Means for electrically interconnecting at least a portion of a first circuit with at least a portion of a second circuit on a circuit board having a plurality of substantially cylindrical electrical connector posts disposed thereon adjacent one edge of said board and projecting therefrom substantially normal to the plane of said board, said means comprising a housing member having a chamber therein which forms an opening in one side of said housing, said opening being adapted to have said edge inserted therethrough and into said chamber, and a plurality of connector members mounted on said housing member, each of said connector members having at least a portion thereof disposed in said chamber with the remaining portion thereof extending through said housing member to be connected to said first circuit, the portions of said connector members disposed in said chamber including a portion disposed at right angles to said first portion and having a plurality of resilient fingers positioned to form a socket to receive one of said posts so as to be electrically and mechanically connected thereto, each of said fingers having a natural resonant frequency which differs from the other fingers in the socket.

3. A device of the class described for electrically interconnecting an electrical circuit with an electrical contact projecting from the side of a circuit board, said device including:

a dielectric housing having a cavity therein forming an opening in one side of said housing, said cavity being constructed and arranged to have an edge of said circuit board inserted into said cavity for positioning said electrical contact in said cavity, at least one electrically conductive connector having a body extending through said housing, said connector having the first end thereof disposed in said cavity and the second end thereof projecting from the side of said housing most remote from the cavity for being electrically connected to the electrical circuit, a socket on said first end of said connector and positioned in said cavity, a base portion in said socket disposed at substantially right angles to said body and positioned to mechanically receive said electrical contact and become electrically interconnected therewith, and a plurality of resilient fingers in said socket at right angles to the base portion, said fingers being positioned to resiliently engage the electrical contact and retain the edge of the circuit board in said cavity.

4. A device of the class described for interconnecting a first electrical circuit with a contact in a second electrical circuit on a circuit board, said device including:

an electrically conductive shank for extending through a restricted opening in a support member, a connector on the first end of said shank for being disposed on one side of said support member when said shank extends through said restricted opening, a socket on the second end of said shank for being positioned on the opposite side of said support member, said socket including a portion substantially normal to said shank and a plurality of resilient fingers on said portion, said fingers being adapted to resiliently engage the contact in said second circuit and become electrically and mechanically connected thereto, and a spring detent on said shank adjacent the connector for being resiliently deformed when moving through the passage, said detent being effective to secure said shank to said support member when said connector is positioned on the first side of said support member and electrically interconnected with said first electrical circuit.

5. A device of the class described for electrically interconnecting a first circuit with at least one electrical connector post disposed thereon adjacent one edge of a circuit board and projecting from said board at right angles thereto, said connector including:

a housing having an elongated chamber forming an opening on one side of said housing member, said opening being constructed and arranged to allow the edge of said board to pass therethrough and into said chamber, an elongated passage extending through the housing, a separate connector member for each of the posts on said board, each of the connector members having a shank that extends through the passage and positions a first end of the connector member in the chamber and a second end of the connector member on the opposite side of the housing, a socket on the said first end of said connector member disposed at right angles to the connector member, said socket being disposed in said chamber and positioned to receive one of said connector posts, said socket opening outwardly toward said side and including portion that embrace the connector post and mechanically secure the circuit board in said chamber, said shank being resiliently deformable and having a free shape that differs from the shape of the passage, and detents on said shank adjacent said second end positioned to be released when said connector member is positioned in said passage for mechanically locking said connector member in said housing with a force greater than required to pull the connector post from the socket.

6. An electrical connector for interconnecting a first electrical circuit with an electrical contact post in a second electrical circuit on a circuit board and projecting from the board at right angles thereto, said connector including:

an electrically conductive shank for being positioned in a dielectric support member, a connector portion on one end of the shank for being positioned on one side of the support member for being electrically interconnected with said first circuit, a base on the other end of said shank for being positioned on the second side of the support member, said base being disposed at right angles to said shank, and a plurality of separate fingers on said base arranged to form a socket having an opening directed away from the shank for receiving the contact post, said fingers being arranged to mechanically engage the electrical contact post and mechanically secure the circuit board in position, said fingers being electrically conductive to maintain an electrical circuit between the connector and the post, each of said fingers having a natural resonant frequency which differs from the resonant frequencies of all of the other fingers to thereby maintain at least one finger on said post at all times.

References Cited by the Examiner

UNITED STATES PATENTS

| | | | |
|---|---|---|---|
| 2,380,589 | 7/45 | Franklin | 339—258 |
| 2,434,740 | 1/48 | Glaser et al. | |
| 2,550,237 | 4/51 | Franklin | 339—258 |
| 2,758,291 | 8/56 | Richards | 339—94 |
| 2,765,450 | 10/56 | Richardson | 339—176 |
| 2,874,206 | 2/59 | Bowers et al. | 339—94 |
| 2,925,537 | 2/60 | Winkler | 339—17 |
| 2,967,284 | 1/61 | Bailey et al. | 339—17 |
| 2,993,187 | 7/61 | Bisbing et al. | 339—17 |
| 2,994,056 | 7/61 | Fox | 339—17 |

FOREIGN PATENTS

| | | |
|---|---|---|
| 69,606 | 7/58 | France. |
| 490,013 | 8/38 | Great Britain. |

OTHER REFERENCES

Knight: I. B. M. Technical Disclosure Bulletin, December 1959, page 9.

Yocum: "Product Eng." April 29, 1963, page 40.

JOSEPH D. SEERS, *Primary Examiner.*